April 29, 1952  H. McTYRE ET AL  2,594,671
INTERNAL REVERSE TAPER REAMER
Filed Jan. 27, 1948  2 SHEETS—SHEET 1
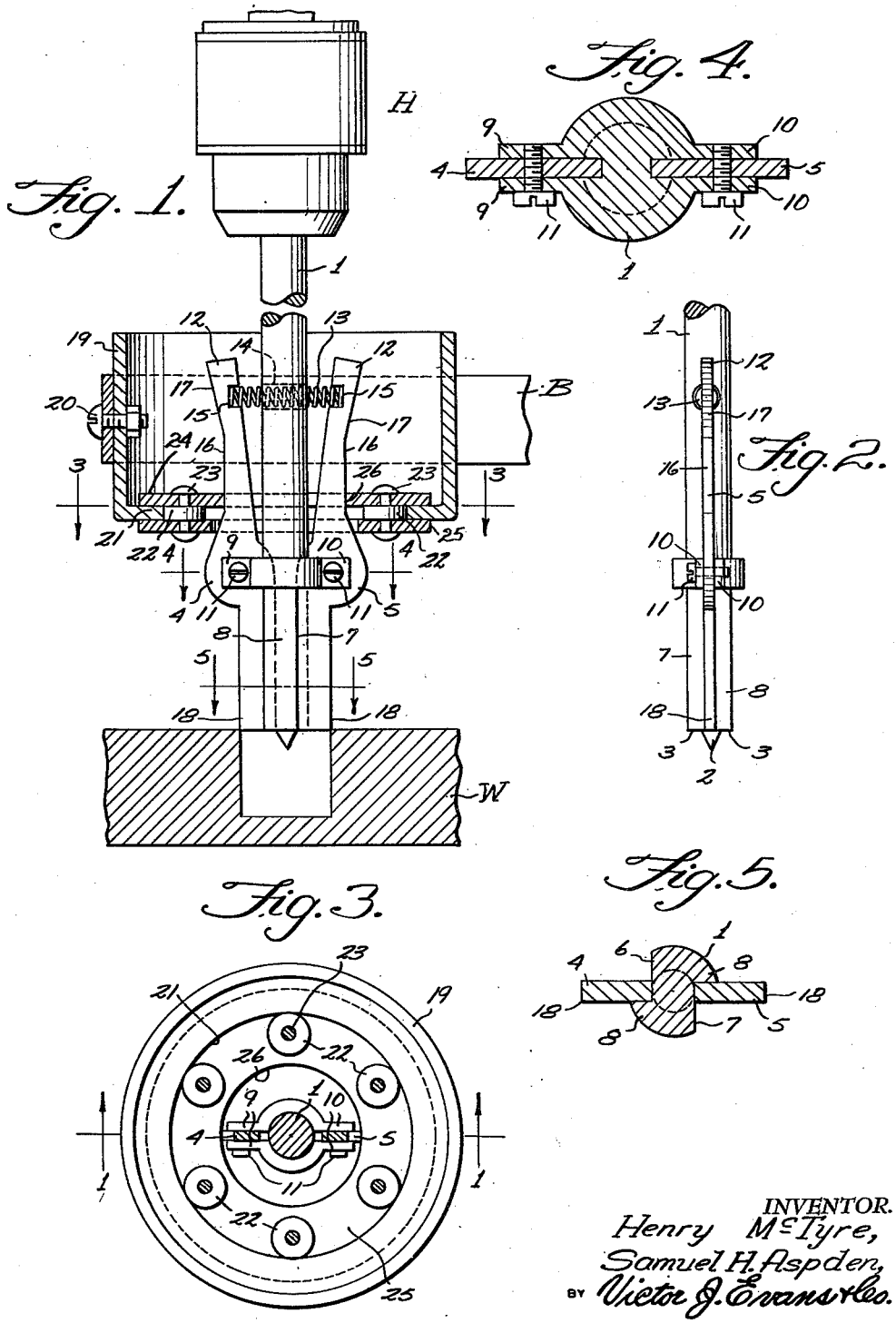

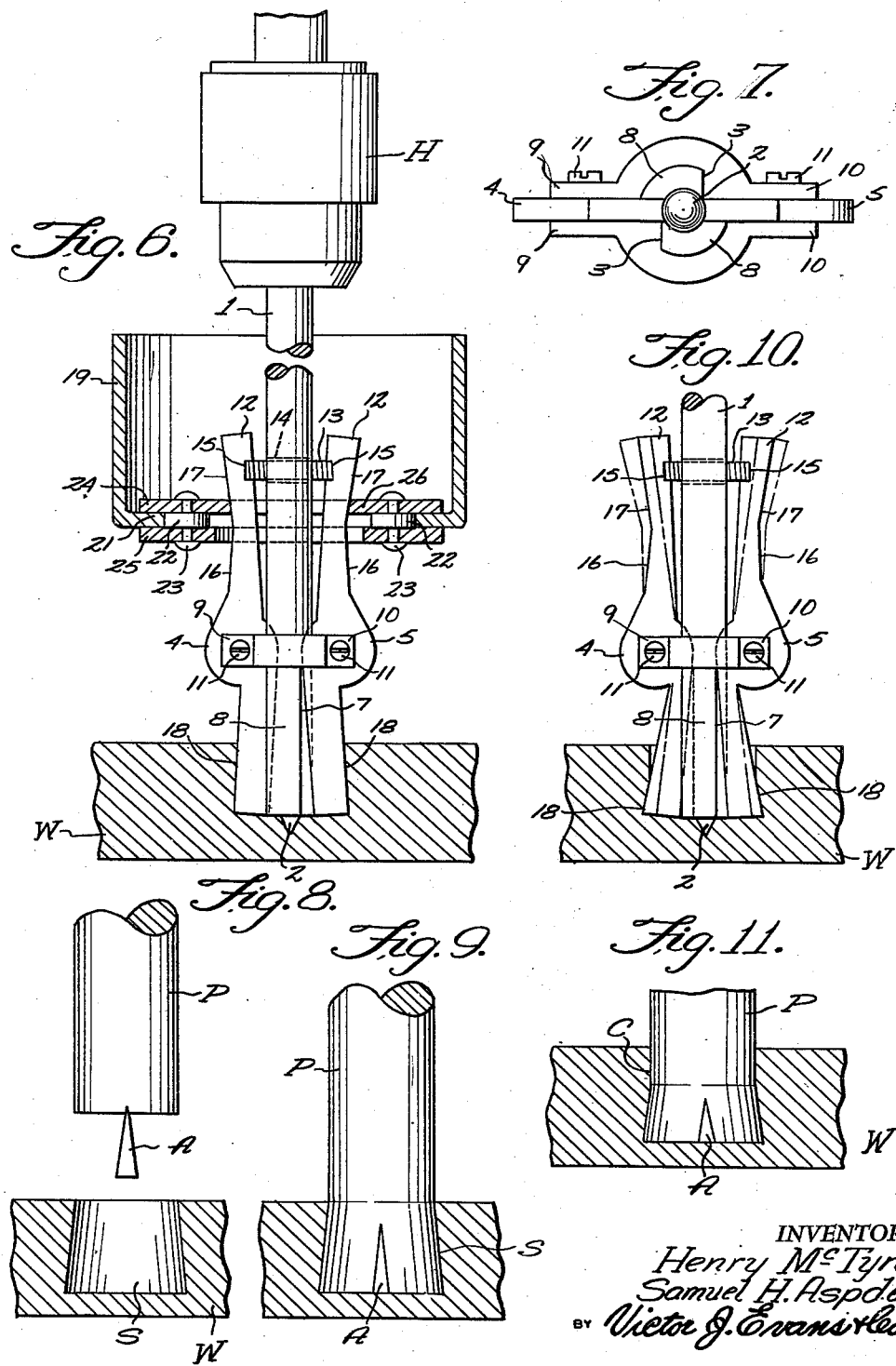

Patented Apr. 29, 1952

2,594,671

UNITED STATES PATENT OFFICE 2,594,671

INTERNAL REVERSE TAPER REAMER

Henry McTyre and Samuel H. Aspden,
Natchitoches, La.

Application January 27, 1948, Serial No. 4,546

2 Claims. (Cl. 145—124)

Our present invention relates generally to improvements in wood working appliances or machine tools of the expanding reverse taper type, and more specifically to an improved internal reverse taper reamer for use in a drill press or other suitable appliance for reaming conical holes. While the tool of our invention is well adapted for various purposes and uses, it is especially designed for fashioning tapered dowel sockets or holes in work that are intended for the reception of dowel pins that are to be driven into and expanded within the tapered socket to insure a tight and permanent fit.

In the formation of the tapered socket an initial straight bore is drilled in the work, and then the initial straight socket or hole is reamed to complete the tapered or conical socket for the pin.

In carrying out our invention the rotary tool shaft is equipped with interchangeable drilling blades by means of which a socket of desired size or shape may be tapered and the bore readily varied from straight to desired tapered shape.

The drilling appliance of our invention includes a minimum number of parts that may with facility and low cost of production be manufactured, and the parts may be assembled, or interchanged with convenience, to insure a tool that is simple in construction and automatic in operation for the performance of its required functions.

The invention consists in certain novel features of construction and combinations and arrangements of parts involving the drill bit, its pivoted cutter blades, and automatic guiding and expanding means as will hereinafter be more fully pointed out, and set forth in the appended claims.

In the accompanying drawings we have illustrated a complete example of a physical embodiment of our invention in which the parts are combined and arranged in accord with one mode we have devised for the practical application of the principles of our invention. It will, however, be understood that changes and alterations are contemplated and may be made in these exemplifying drawings and mechanical structures, within the scope of our claims without departing from the principles of the invention.

Figure 1 is a view in elevation showing a portion of the operating part of the drill, with the stationary guide in section, and with the expanding cutter in initial position for tapering a drilled socket, taken at the plane 1—1 of Figure 3.

Figure 2 is an edge view of the bit with its expanding cutter blades, as seen from the right hand side of Fig. 1.

Figure 3 is a transverse horizontal sectional view at line 3—3 of Fig. 1.

Figure 4 is an enlarged detail transverse horizontal sectional view through the drill shaft and its pivoted blades, as at line 4—4 of Fig. 1.

Figure 5 is a transverse sectional view at line 5—5 of Figure 1 through the grooved shank of the drill and its cutter blades.

Figure 6 is a view similar to Fig. 1 with the tool at the completion of the tapered socket.

Figure 7 is a bottom plan view of the rotary shaft with its cutter blades expanded.

Figure 8 shows a sectional part of the work with its tapered socket, and a dowel pin and wedge preparatory to fitting the pin in the socket; and Figure 9 shows the pin expanded in the socket.

Figure 10 shows the formation of a composite straight and tapered socket by the tool; and Figure 11 shows the dowel pin fitted in and expanded securely in the composite socket.

In order that the general relation and utility of parts may readily be understood we have shown in the assembly views Figs. 1 and 6 the drill shaft 1 mounted in a rotary holder H of a rotary drill press, a stationary or fixed part of which is indicated as a bracket B for supporting the guide that causes automatic expansion of the cutting blades for the formation of a tapered socket.

The solid cylindrical rotary shaft 1 terminates in a sharp pilot point 2, and edges 3 just above the point 2.

In equipping the shaft with the diametrically opposed cutters 4 and 5, the bit 1, as best seen in Fig. 5 is fashioned with lateral diametrically opposed right-angular grooves that extend longitudinally to the point of the bit to form parallel flat faces 6 and 7, together with shoulders 8, 8 and the walls of these grooves terminate in the edges 3, 3 of the shaft.

The cutting blades are pivotally mounted in an integral cross head of the shaft that includes two oppositely extending pairs of spaced parallel apertured ears, flanges or cap plates 9 and 10, and these pairs of plates form supports for the pivot bolts or screws 11. The bolts or screws have smooth bearing journals for the pivoted blades 4 and 5, and the blades are provided with holes for the journals. The upper ends of the respective blades are formed as shanks 12, and these shanks are resiliently held apart by means of a compression spring 13 that passes through a transverse hole 14 in the shaft and has its ends retained in sockets 15 in the adjoining edges of the shanks.

Above their pivotal mounts the blades are each equipped with an outer straight guide edge 16, and these edges in initial drilling position are held by the spring in parallelism with the axial center of the shaft and with each other. These straight edges merge with upwardly and outwardly diverging cam edges 17 that extend to the tops of the shanks for use in outspreading or expanding the cutters 18 at the opposite or lower side of the pivotal mounts of the blades. The cutters which are provided with lateral and bottom cutting edges, are seated in the right-angle corners of the longitudinal grooves of the shaft, and the shoulders 8 of the rotary shaft afford bearings for the cutters which thus revolve or rotate with the rotating shaft, while the flat faces 6 and 7 of the shaft afford bearings for the inner edges of the blades in cutting or tapering a straight hole, as indicated in Fig. 10.

In Fig. 1 before entering a straight socket the straight edges 16 of the shank and the lateral cutting edges of the cutters are in parallelism with the axial center of the shaft; while in Fig. 6 where the cutters are fashioning a tapered hole or socket in the work W the cutters have been expanded and their lateral working edges are disposed at downwardly and outwardly diverging angles to the axial line of the shaft.

This change in position of the cutter blades from parallelism to angular relation to the axis of the shaft is accomplished automatically as the tapering operation proceeds, by means of a rotary guide that is mounted upon a fixed guide holder rigidly mounted upon the bracket B of the drill press.

The guide holder includes a preferably cylindrical base or cup 19 that is attached to the bracket B by bolts or screws 20, and this open bottom cup that surrounds the shaft and its cutter blades is provided with an annular bottom flange 21 that forms a circular track for the anti-friction rollers 22 of the rotatable guide which rotates with the shaft and blades.

These rollers are journaled at 23 between spaced upper and lower circular or annular plates 24 and 25, the outer edges of which overlap and embrace the flange 21 of the bearing cup at the top and bottom respectively, and the journals 23 rigidly retain the spaced plates as a unitary structure in which the rollers are mounted to roll against the inner edge of the flange 21 therebetween.

This rotatably mounted guide is retained by the bearing cup against vertical movement, but it rotates with the shaft and its expanding cutters and the guide automatically spreads or expands the cutters as the tapering operation proceeds for a tapered socket. For this purpose the upper plate 24 is provided with a transverse or diametrically extending slot 26 that conforms to the size and shape of the shaft and the shanks of the cutter blades, and the opposite end walls of this slot surround and fit about the shanks 12 with the opposite end walls of the slot co-acting with the outer edges of the shanks of the blades.

When fashioning a straight bore the parallel edges 16, 16 of the blades co-act with the walls of the slot, and when fashioning a tapered bore or socket, due to the feed of the rotating tool, the cam edges 17, 17 of the pivoted blades frictionally engage the opposite end walls of the slot 26, as indicated in Fig. 6. As the fashioning of the tapered hole proceeds and the rotating shaft is fed downwardly, the cam edges 17 in sliding engagement with the slot-walls of the rotating guide draw the two shanks toward each other, compress the spring 13, and gradually expand the working edges of the cutter blades.

As the rotating tool is backed out or elevated from the tapered socket the shanks are released from their cam action, the previously compressed spring expands to spread apart the shanks 12 and simultaneously retract the two expanded cutter blades to initial closed position for withdrawal from the socket.

The tapered socket S shown in the work W in Fig. 8 is fitted with a dowel pin P that is previously provided with a kerf in its lower end to receive the wedge or spreader A, and when the pin, with its wedge is driven into the socket the expanded end is securely fitted within the socket as in Fig. 9.

In Figs. 10 and 11 a composite socket C is provided for the pin P, which as indicated in Fig. 1 is drilled, initially, as a straight bore and the tool with the cutting blades in position of Fig. 1 is inserted into the bore, and then as the tool advances into the work the blades are automatically expanded or spread apart for drilling the tapered portion of the socket as in Fig. 10.

For reaming sockets of different sizes and shapes, a shaft may be provided with a set of expansible blades that are interchangeable and which may with facility be mounted upon or dismounted from the shaft, and of course shafts of different sizes are provided with larger or smaller complementary expansible cutting blades.

Having thus fully described our invention, what we claim as new and desire to secure by Letters Patent is:

1. In an internal reverse taper reamer, a rotary shaft having diametrically opposed laterally arranged and longitudinally extending grooves along one end forming right angular seats, a plurality of removably and pivotally mounted diametrically arranged expansible cutter blades normally positioned in said seats, said blades having normally parallel lower cutting edges when the lower portions of the blades are disposed in the grooves, a shank on each blade disposed above the pivots, each shank having a straight edge and an outwardly diverging cam edge thereabove, spring means carried by the bit normally urging the shanks apart to position the blades in said grooves, a fixed circular holder around the bit and shanks and having an inturned bottom flange, and a guide rotatably mounted on said holder and comprising upper and lower plates above and below the flange respectively and rollers between the plates having pivot pins connecting the same, said rollers engaging the flange edge and one of the plates each having a slot receiving the shanks therethrough to force the shanks inwardly and spread the blades when moved longitudinally of the bit in drilling.

2. In an internal reverse taper reamer, a rotary shaft having a transverse hole therein and diametrically opposed laterally arranged and longitudinally extending grooves along one end forming right angular seats, an integral cross head including two pairs of oppositely extending radial flanges, a pair of normally parallel spaced radial cutting blades extending between the flanges and into the grooves, a pair of bolts passed through said flanges and said blades and forming pivots for the blades, each of said blades having a longitudinally extending shank provided with a straight edge merging into a cam edge on each shank, a compression spring passed through said hole with its ends in engagement with said shanks, a slotted guide slidably supported about the shaft and receiving the shanks of the blades therethrough for rotation therewith, and the ends of the slot engaging the cam edge of the blade to spread the blades in outwardly divergent relation to the shaft, during the operation of said reamer.

HENRY McTYRE.
SAMUEL H. ASPDEN.

REFERENCES CITED

The following references are of record in the file of this patent:

UNITED STATES PATENTS

| Number    | Name     | Date          |
|-----------|----------|---------------|
| 845,360   | Jungling | Feb. 26, 1907 |
| 994,457   | Green    | June 6, 1911  |
| 1,459,366 | Gosper   | June 19, 1923 |
| 1,536,208 | Gosper   | May 5, 1925   |
| 1,637,745 | Gosper   | Aug. 2, 1927  |